(12) United States Patent
Oteri et al.

(10) Patent No.: US 12,294,434 B2
(45) Date of Patent: May 6, 2025

(54) CSI FEEDBACK FOR MULTI-PDSCH TRANSMISSION

(71) Applicant: Apple Inc., Cupertino, CA (US)

(72) Inventors: Oghenekome Oteri, San Diego, CA (US); Wei Zeng, Saratoga, CA (US); Dawei Zhang, Saratoga, CA (US); Seyed Ali Akbar Fakoorian, San Diego, CA (US); Weidong Yang, San Diego, CA (US); Sigen Ye, Whitehouse Station, NJ (US); Chunhai Yao, Beijing (CN); Yushu Zhang, Beijing (CN); Chunxuan Ye, San Diego, CA (US); Hong He, San Jose, CA (US); Haitong Sun, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/442,083

(22) PCT Filed: Aug. 5, 2021

(86) PCT No.: PCT/CN2021/110744
§ 371 (c)(1),
(2) Date: Sep. 22, 2021

(87) PCT Pub. No.: WO2023/010384
PCT Pub. Date: Feb. 9, 2023

(65) Prior Publication Data
US 2024/0030986 A1   Jan. 25, 2024

(51) Int. Cl.
*H04B 7/06*    (2006.01)
(52) U.S. Cl.
CPC ......... *H04B 7/0632* (2013.01); *H04B 7/0626* (2013.01)

(58) Field of Classification Search
CPC .... H04B 7/0626; H04B 7/0628; H04B 7/063; H04B 7/0632; H04L 5/00; H04L 5/0057;
(Continued)

(56) References Cited

U.S. PATENT DOCUMENTS 12,160,869 B2 * 12/2024 Zhang .................. H04W 4/06
2015/0263796 A1    9/2015 Nam et al.
(Continued)

FOREIGN PATENT DOCUMENTS

CN    102780547 A    11/2012
CN    106105052 A    11/2016
(Continued)

OTHER PUBLICATIONS

International Search Report and Written Opinion directed to International Patent Application No. PCT/CN2021/110744, mailed Mar. 28, 2022; 8 pages.
(Continued)

*Primary Examiner* — Habte Mered
*Assistant Examiner* — Prince A Mensah
(74) *Attorney, Agent, or Firm* — Sterne, Kessler, Goldstein & Fox P.L.L.C.

(57) ABSTRACT

Some embodiments include an apparatus, method, and computer program product for implementing Channel State information (CSI) feedback for multi-Physical Downlink Shared Channel (PDSCH) transmissions in a wireless communication system. Some embodiments enable a user equipment (UE) to determine Channel Quality Indicators (CQI) and/or Precoding Matrix Indicators (PMI) for multi-PDSCH transmissions that account for effects of a duration of the multi-PDSCH transmission including the maximum interval between the first and last PDSCH transmissions on the CQI and PMI determinations. Some embodiments include a base station that detects a need for a change in a beam direction (Continued)

and adjusts the beam direction accordingly based on the PMI determinations. Some embodiments enable a desired hybrid automatic repeat request (HARQ)-ACK feedback transmission from a single multi-PDSCH transmission. Some embodiments include performing HARQ bundling with an update to the Type 1 HARQ-ACK codebook based on the multi-PDSCH transmission.

20 Claims, 12 Drawing Sheets

(58) Field of Classification Search
CPC ...... H04L 25/023; H04W 4/06; H04W 24/10; H04W 52/146; H04W 72/0446
See application file for complete search history.

(56) References Cited

U.S. PATENT DOCUMENTS

| | | | |
|---|---|---|---|
| 2020/0112869 A1* | 4/2020 | Kim | H04B 7/0632 |
| 2021/0067276 A1* | 3/2021 | Wang | H04L 1/1861 |
| 2021/0076243 A1* | 3/2021 | Manolakos | H04L 25/023 |
| 2021/0091835 A1* | 3/2021 | Manolakos | H04L 5/0051 |
| 2021/0143870 A1 | 5/2021 | Faxér et al. | |
| 2021/0281305 A1* | 9/2021 | Grant | H04W 24/10 |
| 2021/0351876 A1* | 11/2021 | Huang | H04L 1/1861 |
| 2022/0150907 A1* | 5/2022 | Tian | H04L 1/1854 |
| 2022/0399960 A1* | 12/2022 | Bae | H04L 5/00 |
| 2023/0092884 A1* | 3/2023 | Bae | H04W 52/146 455/522 |
| 2023/0224134 A1* | 7/2023 | Li | H04L 5/0057 370/329 |
| 2023/0232402 A1* | 7/2023 | Zhang | H04B 7/0626 370/329 |
| 2023/0239082 A1* | 7/2023 | Choi | H04L 1/1854 |
| 2023/0413091 A1* | 12/2023 | Babaei | H04W 4/06 |
| 2024/0008038 A1* | 1/2024 | Li | H04W 72/0446 |

FOREIGN PATENT DOCUMENTS

| | | |
|---|---|---|
| WO | WO 2016056970 A1 | 4/2016 |
| WO | WO 2018229078 A1 | 12/2018 |
| WO | WO 2020072899 A1 | 4/2020 |

OTHER PUBLICATIONS

Extended European Search Report directed to related European Application No. 21952281.0, mailed Jan. 20, 2025; 10 pages.

* cited by examiner

CSI FEEDBACK FOR MULTI-PDSCH TRANSMISSION

CROSS-REFERENCE TO RELATED APPLICATION

This application is a U.S. National Phase of International Application No. PCT/CN2021/110744, filed Aug. 5, 2021, which is hereby incorporated by reference in its entirety.

BACKGROUND

Field

The described embodiments relate generally to multi-Physical Downlink Shared Channel (PDSCH) transmissions in wireless communications.

SUMMARY

Some embodiments include a system, method, and computer program product for Channel State Information (CSI) feedback for multi-Physical Downlink Shared Channel (PDSCH) transmissions. Some embodiments include a user equipment (UE) that can receive one or more CSI-Reference Signals (RSs), and transmit Channel Quality Indicator (CQI) feedback corresponding to the one or more CSI-RSs received. Subsequently, the UE can receive a downlink control information (DCI) signal that indicates a multi-PDSCH transmission with one modulation and coding scheme (MCS) based at least on the CQI feedback. The UE can receive PDSCH transmissions corresponding to the multi-PDSCH transmission, where the PDSCH transmissions are based at least on the one MCS. In some examples, a CSI-RS of the one or more CSI-RSs correspond to a PDSCH transmission of the multi-PDSCH transmission. The CQI feedback can include multiple CSI Resource Indicators (CRIs) that correspond to the one or more CSI-RSs, where a CRI of the multiple CRIs includes a corresponding CQI. In some embodiments, the CQI feedback can include a single CRI with multiple CQIs, wherein the multiple CQIs correspond to the one or more CSI-RSs.

In some embodiments, the CQI feedback corresponds to CQI_effective, and the UE can determine CQI_effective based at least on the one or more CSI-RSs. When a transport block error probability is to be applied to each of the PDSCH transmissions of the multi-PDSCH transmission, the UE can determine the CQI_effective based at least on: a last N CSI-RSs of the one or more CSI-RSs received, where N is an integer; or a subset of the last N CSI-RSs of the one or more CSI-RSs received, where N is an integer.

When a transport block error probability is to be applied to at least one PDSCH transmission of the multi-PDSCH transmission, the UE can determine the CQI_effective based on at least one CSI-RS of the one or more CSI-RSs that corresponds to the at least one PDSCH transmission. For example, the UE can utilize a time urgency type or a time duration to determine CQI_effective. In some embodiments, to determine the CQI_effective, the UE can utilize: a single PDSCH CQI corresponding to a PDSCH transmission of the multi-PDSCH transmission, or multiple PDSCH CQIs corresponding to multiple PDSCH transmissions of the multi-PDSCH transmission. In some embodiments, when the transport block error probability is a function of error probabilities of all the PDSCH transmissions of the multi-PDSCH transmission, to determine the CQI_effective, the UE can perform CQI filtering at layer 1 or layer 3.

In some embodiments, the UE can receive a DCI signal comprising a Time Domain Resource Allocation (TDRA) row corresponding to the multi-PDSCH transmission, and generate Hybrid Automatic Repeat Request (HARQ)-ACK bits for the PDSCH transmissions of the multi-PDSCH transmission associated with the TDRA row. In some embodiments, the UE can receive an indication that a K1 corresponding to the multi-PDSCH transmission includes a single value.

In some embodiments, the UE can construct a HARQ-ACK codebook based at least on the PDSCH transmissions of the multi-PDSCH transmission, prune HARQ-ACK bits of the HARQ-ACK codebook, allocate the pruned HARQ-ACK bits to one or more bundles, and perform an AND operation within a bundle of the one or more bundles. The UE can transmit the bits after bundling to a base station. In some embodiments, where M indicates a number of bundles and M is an integer, the UE can receive the number of bundles, M, via semi-static signaling or dynamic signaling. In some embodiments, where M indicates a maximum number of bits in a bundle, the UE can allocate up to M bits of the pruned HARQ-ACK bits to a bundle of the one or more bundles.

In some embodiments, the UE can receive via the transceiver, a configuration message comprising: a Quasi co-location (QCL), and a multi-CSI-RS Aperiodic Non-Zero Power (NZP) CSI-RS for channel measurement (CM) with multi-PDSCH feedback; or the QCL and a multi-CSI-RS Aperiodic NZP CSI-RS for CM with periodicity, offset, and a duration, where the transmission of the one or more CSI-RSs to the UE stops after the duration.

Some embodiments include a base station (BS) that can transmit one or more CSI RSs, receive CQI feedback corresponding to the one or more CSI-RSs transmitted, and transmit PDSCH transmissions corresponding to a multi-PDSCH transmission, where the PDSCH transmissions use a MCS based at least on the CQI feedback, and where a CSI-RS of the one or more CSI-RSs correspond to a PDSCH transmission of the multi-PDSCH transmission. The CQI feedback can include multiple CRI that correspond to the one or more CSI-RSs, where a CRI of the multiple CRI includes a corresponding CQI, or a single CRI with multiple CQI, where the multiple CQI correspond to the one or more CSI-RSs. The BS can process the received CQI feedback, and determine the MCS for the multi-PDSCH transmission, where the MCS is applied to each PDSCH transmission of the multi-PDSCH transmission.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

Figure 1:
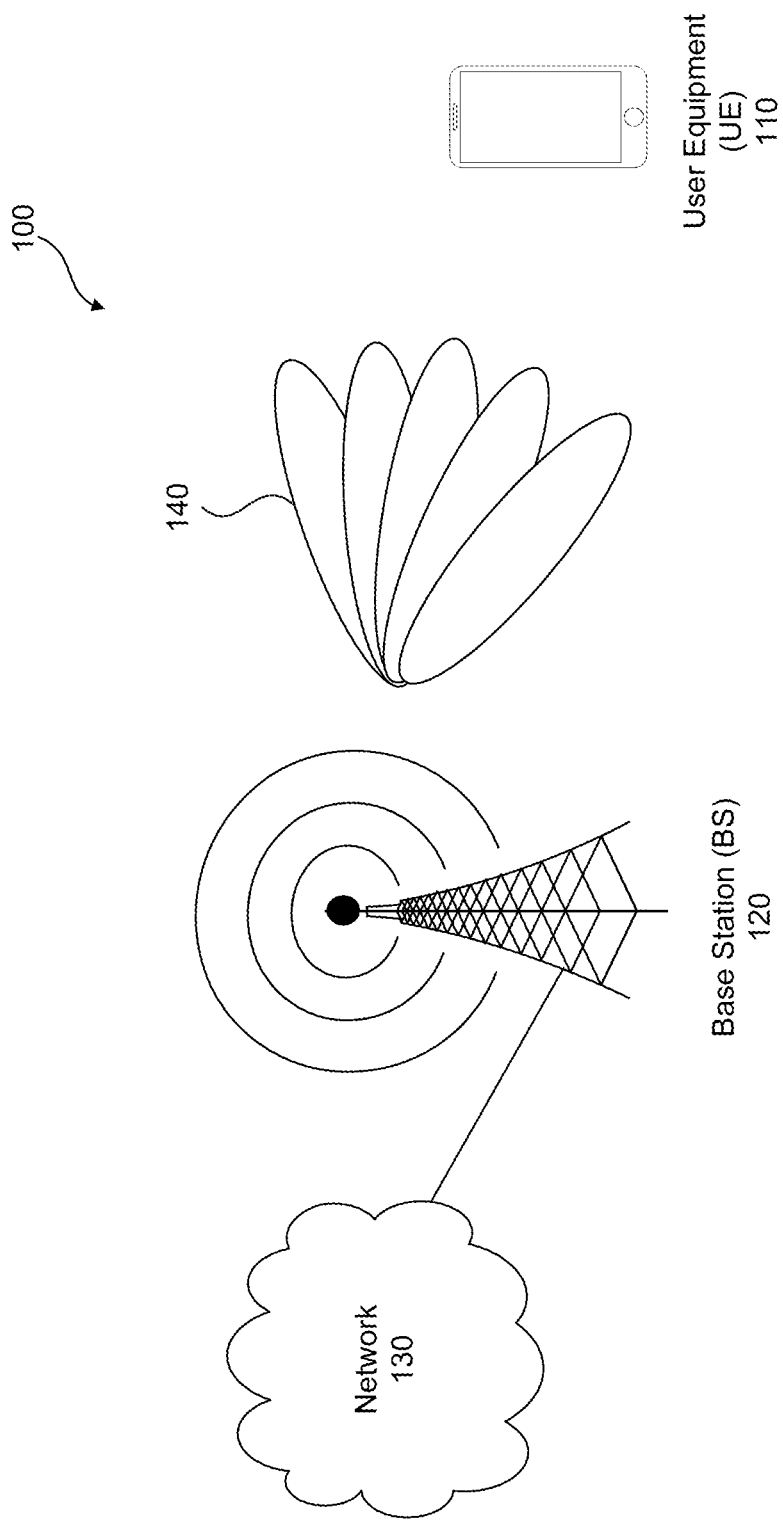
FIG. 1 illustrates an example of a wireless system supporting Channel State Information (CSI) feedback for multi-Physical Downlink Shared Channel (PDSCH) transmissions, in accordance with some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some new radio (NR) or fifth generation (5G) wireless communications include transmitting a single downlink (DL) downlink control information (DCI) signal to schedule multiple Physical Downlink Shared Channel (PDSCH) transmissions. In some examples, a single uplink (UL) DCI signal can be used to schedule multiple Physical Uplink Shared Channel (PUSCH) transmissions. Each PDSCH or PUSCH transmission of the multiple transmissions includes individual or separate transport blocks (TBs) and each PDSCH or PUSCH transmission is located within a transmission slot of a radio frame transmission. For example, a single DCI format 0_1 can include a multi-PUSCH transmission for scheduling multiple PUSCH transmissions. A single DCI format 1_1 can include a multi-PDSCH transmission for scheduling multiple PDSCH transmissions. In other words, a single DCI signal can include a multi-PxSCH transmission used to schedule multiple PxSCH transmissions, where the x can be Downlink (D) or Uplink (U).

FIG. 1 illustrates example 100 of a wireless system supporting Channel State Information (CSI) feedback for multi-PDSCH transmissions, in accordance with some embodiments of the disclosure. Example 100 includes base station (BS) 120 that communicates via one or more beams like beam 140 with user equipment (UE) 110. BS 120 can be communicatively coupled to network 130. UE 110 can be an electronic device that may include but is not limited to a cellular phone, a smart phone, a tablet, a personal digital assistant (PDA), or a laptop. BS 120 can include but is not limited to a fifth generation Node B (gNB) operating in Frequency Range 1 (FR1) and/or Frequency Range 2 (FR2). An example of next generation communications include but is not limited to 5G or NR communications as defined by 3rd Generation Partnership Project (3GPP) standards. For example, UE 110 and BS 120 can include an electronic device configured to operate using a 3GPP release, such as Release 17 (Rel-17), or other 3GPP standards. Network 130 can include but is not limited to, any combination of data networks, local area networks (LANs), metropolitan area networks (MANs), Public Land Mobile Networks (PLMN), wireless local area networks (WLANs), and/or the Internet.

Figure 2:
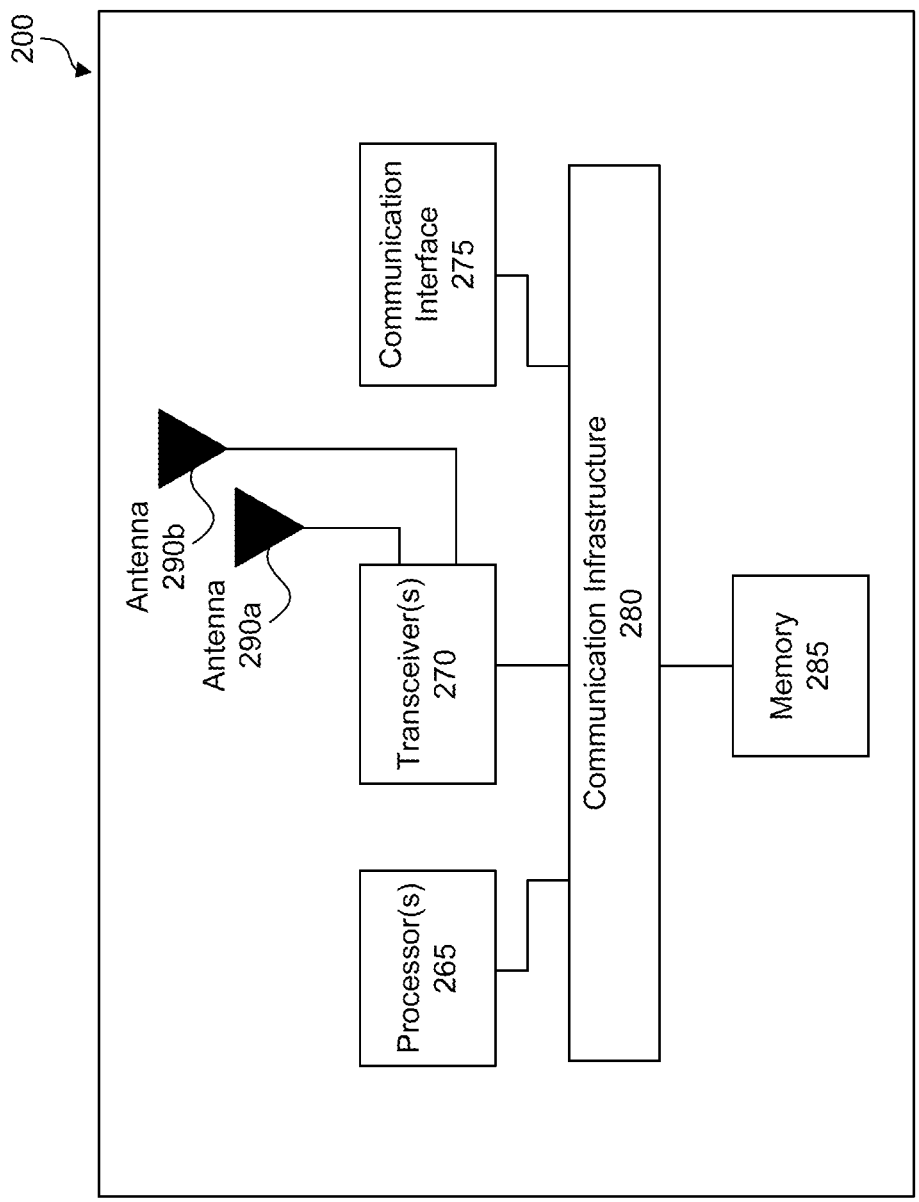
FIG. 2 illustrates a block diagram of an example system supporting CSI feedback for multi-PDSCH transmissions, according to some embodiments of the disclosure.

FIG. 2 illustrates a block diagram of example system 200 supporting CSI feedback for multi-PDSCH transmissions, according to some embodiments of the disclosure. For explanation purposes and not a limitation, FIG. 2 may be described with reference to elements from FIG. 1. For example, system 200 may perform the functions of UE 110 and/or BS 120 of FIG. 1. System 200 includes one or more processors 265, transceiver(s) 270, communication interface 275, communication infrastructure 280, memory 285, and antenna 290. Memory 285 may include random access memory (RAM) and/or cache, and may include control logic (e.g., computer instructions) and/or data. One or more processors 265 can execute the instructions stored in memory 285 to perform operations enabling wireless system 200 to transmit and receive wireless communications, including the functions for supporting CSI feedback for multi-PDSCH transmissions described herein. In some embodiments, one or more processors 265 can be "hard coded" to perform the functions herein. Transceiver(s) 270 transmits and receives wireless communications signals including wireless communications supporting CSI feedback for multi-PDSCH transmissions according to some embodiments, and may be coupled to one or more antennas 290 (e.g., 290a, 290b). In some embodiments, a transceiver 270a (not shown) may be coupled to antenna 290a and different transceiver 270b (not shown) can be coupled to antenna 290b. Communication interface 275 allows system 200 to communicate with other devices that may be wired and/or wireless. Communication infrastructure 280 may be a bus. Antenna 290 may include one or more antennas that may be the same or different types.

To support a single DCI Signal for a multi-PxSCH transmission, an extended TDRA table can be employed such that each row of a Time Domain Resource Allocation (TDRA) table indicates up to 8 multiple PDxSCH transmissions that can be non-continuous in the time-domain. Each PxSCH transmission of a multi-PxSCH transmission signaled can be represented as a separate start and length indicator value (SLIV) in a row of a TDRA table.

Figure 9:
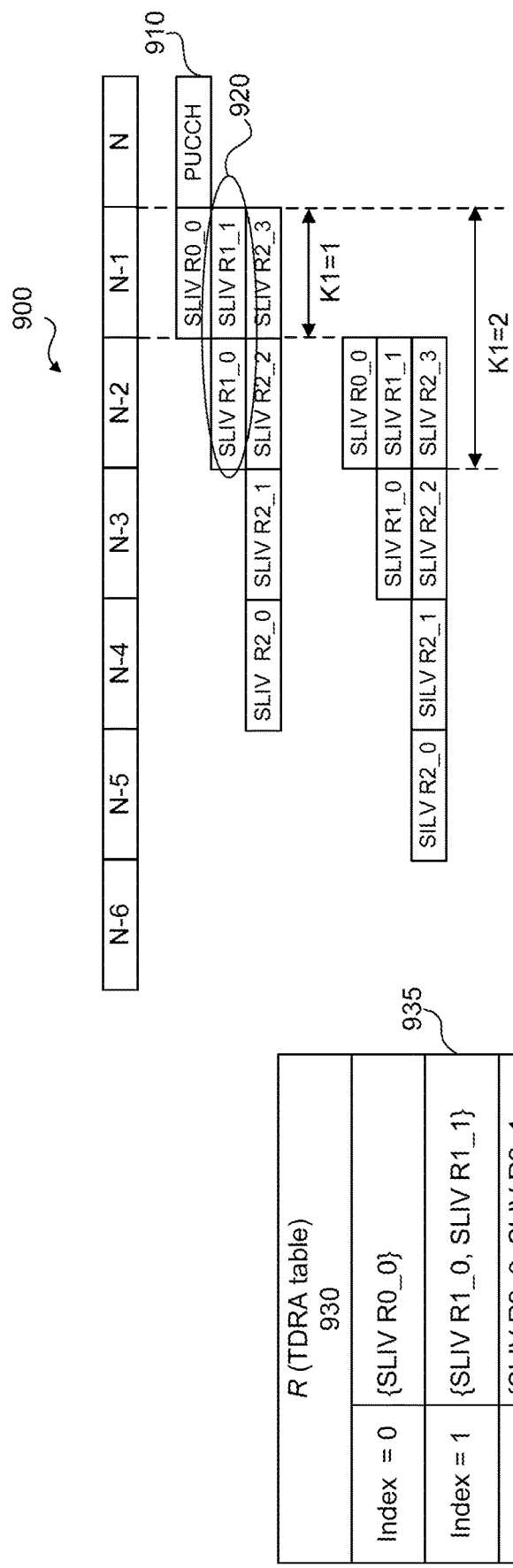
FIG. 9 illustrates an example of a Time Domain Resource Allocation (TDRA) table and corresponding transmissions, according to some embodiments of the disclosure.

FIG. 9 illustrates example 900 of TDRA table 930 and corresponding transmissions, according to some embodiments of the disclosure. Hybrid Automatic Repeat reQuest (HARQ)-ACK bits corresponding to PDSCH transmissions of TDRA table 930 for K1=1 and K1=2 can be provided in Physical Uplink Control Channel (PUCCH) resource 910. Multiple PDSCH transmissions or multiple PUSCH transmissions corresponding to a multi-PxSCH transmission conveyed in a single DCI signal can be illustrated in a row of TDRA table 930. For example, a single DCI signal including a multi-PDSCH transmission can be illustrated as row 935 and the corresponding two PDSCH transmissions are depicted in transmissions 920.

The single DCI signal including the multi-PxSCH transmission includes a single Modulation and Coding Scheme (MCS) that applies commonly to the first TB of each PxSCH transmission of the corresponding multi-PxSCH transmission. Given that there is one MCS for the multiple PxSCH transmissions of a multi-PxSCH transmission, some embodiments include a method, system, and apparatus for providing Channel Quality Indicator (CQI) feedback to account for the duration of a multi-PxSCH transmission.

The CQI for multi-PDSCH transmission may be determined by the maximum interval between the first and last PDSCH transmissions and the channel variation. BS 120 can determine the MCS to be used for the multi-PDSCH transmission. The MCS in the DCI for the multi-PDSCH transmission is valid for all the PDSCHs transmissions of the multi-PDSCH transmission. Thus, BS 120 can acquire CQI feedback and determine an effective CQI index (e.g., CQI_effective) from which an MCS is determined and set, where the MCS is suitable for the first through the last PDSCH transmission, even in the presence of channel variation. Accordingly, there is a need for CQI feedback suitable for multi-PDSCH transmission (e.g., a multi-PDSCH specific CQI/PMI) that may differ from the CQI/PMI needed for single PDSDCH transmission. In some embodiments, UE 110 utilizes the multi-PDSCH specific CQI/PMI to determine a CQI_effective, and transmit the CQI_effective to BS 120.

Figure 3A:
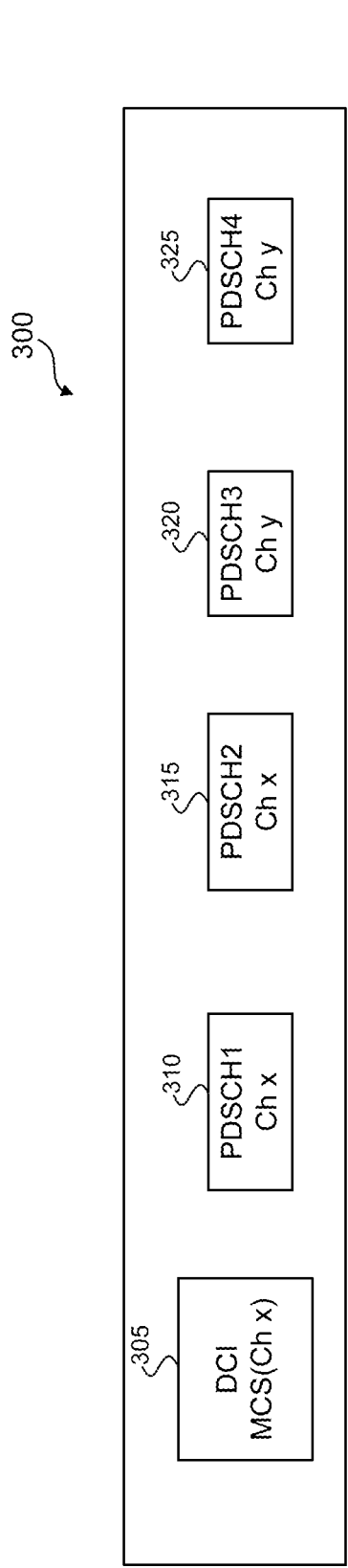
FIG. 3A illustrates an example with a single modulation and coding scheme (MCS), according to some embodiments of the disclosure.

FIG. 3A illustrates example 300 with a single MCS, according to some embodiments of the disclosure. As a convenience and not a limitation, FIG. 3A may be described with reference to elements from other figures in the disclosure. For example, example 300 can refer to signals transmitted between BS 120 and UE 110 of FIG. 1. Example 300 illustrates BS 120 transmitting DCI signal 305 for a multi-PDSCH transmission using a single MCS value to UE 110. Subsequently, BS 120 transmits 4 PDSCH transmissions, 310, 315, 320, and 325 to UE 110. BS 120 utilizes CSI feedback from UE 110 to determine what single MCS value to employ to successfully transmit PDSCH transmissions of the multi-PDSCH transmission on channels x and y. BS 120 can employ example 330 of FIG. 3B or example 370 of FIG. 3C to determine the appropriate single MCS value.

Figure 3B:
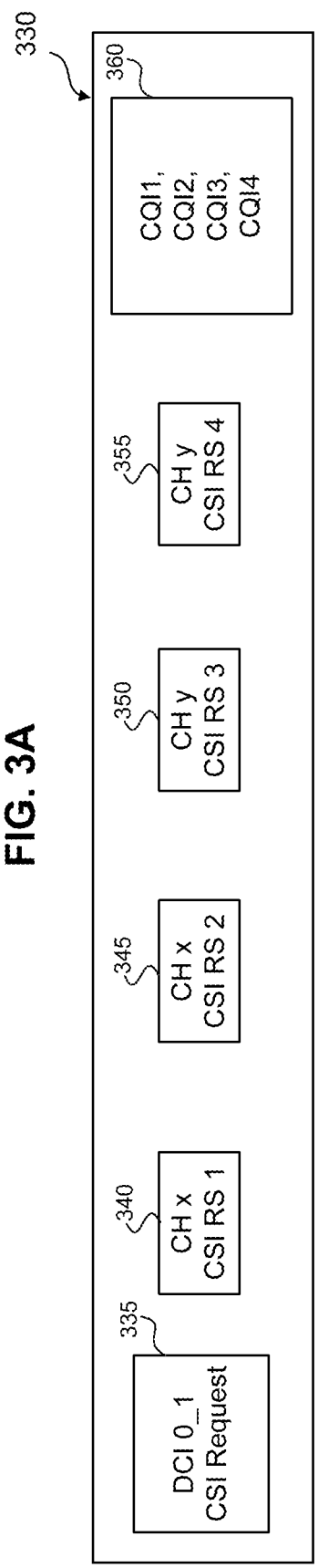
FIG. 3B illustrates an example of CSI feedback for multi-PDSCH transmission with a base station (BS) estimating channel quality indicator (CQI) effective, according to some embodiments of the disclosure.

FIG. 3B illustrates example 330 of CSI feedback for multi-PDSCH transmission with BS 120 estimating CQI_effective, according to some embodiments of the disclosure. As a convenience and not a limitation, FIG. 3B may be described with reference to elements from other figures in the disclosure. For example, example 330 can refer to signals transmitted between BS 120 and UE 110 of FIG. 1. BS 120 can request X CQI/Precoding Matrix Indicator (PMI) reports or a single CQI/PMI report and uses the results in the report to estimate the MCS and/or beam to be signaled in a subsequent DCI for multi-PDSCH transmission (e.g., DCI 305 of FIG. 3A.)

For example, BS 120 can transmit a DCI signal with a multi-slot CSI-reference signal (RS) trigger, and request results in either multiple CQI/PMI reports or a single CQI/PMI report. BS 120 can utilize the results to determine a CQI_effective value that can be used to estimate a MCS and/or beam to be signaled in a subsequent DCI scheduling a multi-PDSCH transmission. For example, BS 120 can transmit DCI signal 335 such as a DCI 0_1 CSI Request signal, to UE 110. Subsequently, BS 120 can transmit CSI-reference signals (RSs) 340, 345, 350, and 355 to UE 110. UE 110 can measure the received CSI-RSs 340, 345, 350, and 355 and provide a corresponding CQI/PMI report (not shown) after each received CSI-RS, or provide a single CQI/PMI report 360 that includes CQI/PMI measurements 1-4 that correspond to CSI-RSs 340, 345, 350, and 355. BS 120 can use the results from the CQI/PMI report(s) to determine a CQI_effective value that BS 120 can use to determine a MCS value appropriate for transmitting PDSCH transmissions of a multi-PDSCH transmission where the PDSCH transmissions correspond to the transmitted CSI-RSs 340, 345, 350, and 355 (e.g., the channels.)

Returning to example 300 of FIG. 3A, BS 120 can include the determined MCS value in DCI signal 305 that signals a multi-PDSCH transmission. BS 120 can use the determined MCS value to subsequently transmit PDSCH transmissions 310, 315, 320, and 325 to UE 110. PDSCH transmissions 310, 315, 320, and 325 can correspond to the channels on which CSI-RSs 340, 345, 350, and 355 were transmitted.

Figure 3C:
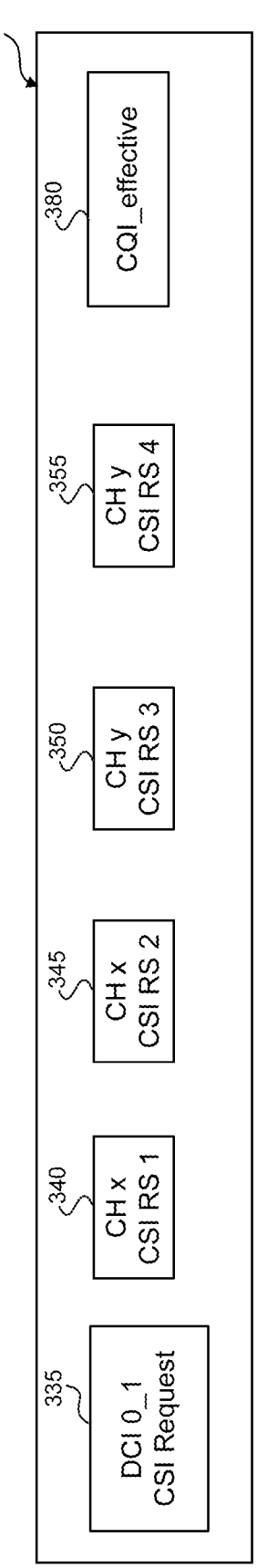
FIG. 3C illustrates an example of CSI feedback for multi-PDSCH transmission with a user equipment (UE) estimating channel quality indicator (CQI)_effective, according to some embodiments of the disclosure.

FIG. 3C illustrates example 370 of CSI feedback for multi-PDSCH transmission with UE 110 estimating CQI_effective, according to some embodiments of the disclosure. As a convenience and not a limitation, FIG. 3C may be described with reference to elements from other figures in the disclosure. For example, example 370 can refer to signals transmitted between BS 120 and UE 110 of FIG. 1. BS 120 can request that UE 110 estimate one CQI/PMI, CQI_effective, for multi-PDSCH transmission. BS 120 can request a single CQI/PMI report using a single CSI-RS Channel Measurement (CM) resource and a single CSI-RS Interference Measurement (IM) resource, or multiple CSI-RS CM resources and multiple CSI-RS IM resources to be reported in a single CSI reporting/feedback opportunity.

For example, BS 120 can transmit a DCI signal with a multi-slot CSI-reference signal (RS) trigger, and request that UE 110 determine CQI effective that can be used to estimate an MCS and/or beam to be signaled in a subsequent DCI scheduling a multi-PDSCH transmission (e.g., DCI 305 of FIG. 3A). For example, BS 120 can transmit DCI signal 335 such as a DCI 0_1 CSI Request signal, to UE 110. Subsequently, BS 120 can transmit CSI-reference signals (RSs) 340, 345, 350, and 355 to UE 110. UE 110 can measure the received CSI-RSs 340, 345, 350, and 355 determine CQI_effective that can include PMI data. UE 110 can transmit CQI_effective 380 including the CQI_effective value that BS 120 can use to determine a MCS value appropriate for transmitting PDSCH transmissions of a multi-PDSCH transmission where the PDSCH transmissions correspond to the transmitted CSI-RSs 340, 345, 350, and 355.

Returning to example 300 of FIG. 3A, BS 120 can include the determined MCS value in DCI signal 305 that signals a multi-PDSCH transmission. BS 120 can use the determined MCS value to subsequently transmit PDSCH transmissions 310, 315, 320, and 325 to UE 110. PDSCH transmissions 310, 315, 320, and 325 can correspond to the transmitted CSI-RSs 340, 345, 350, and 355.

Figure 4:
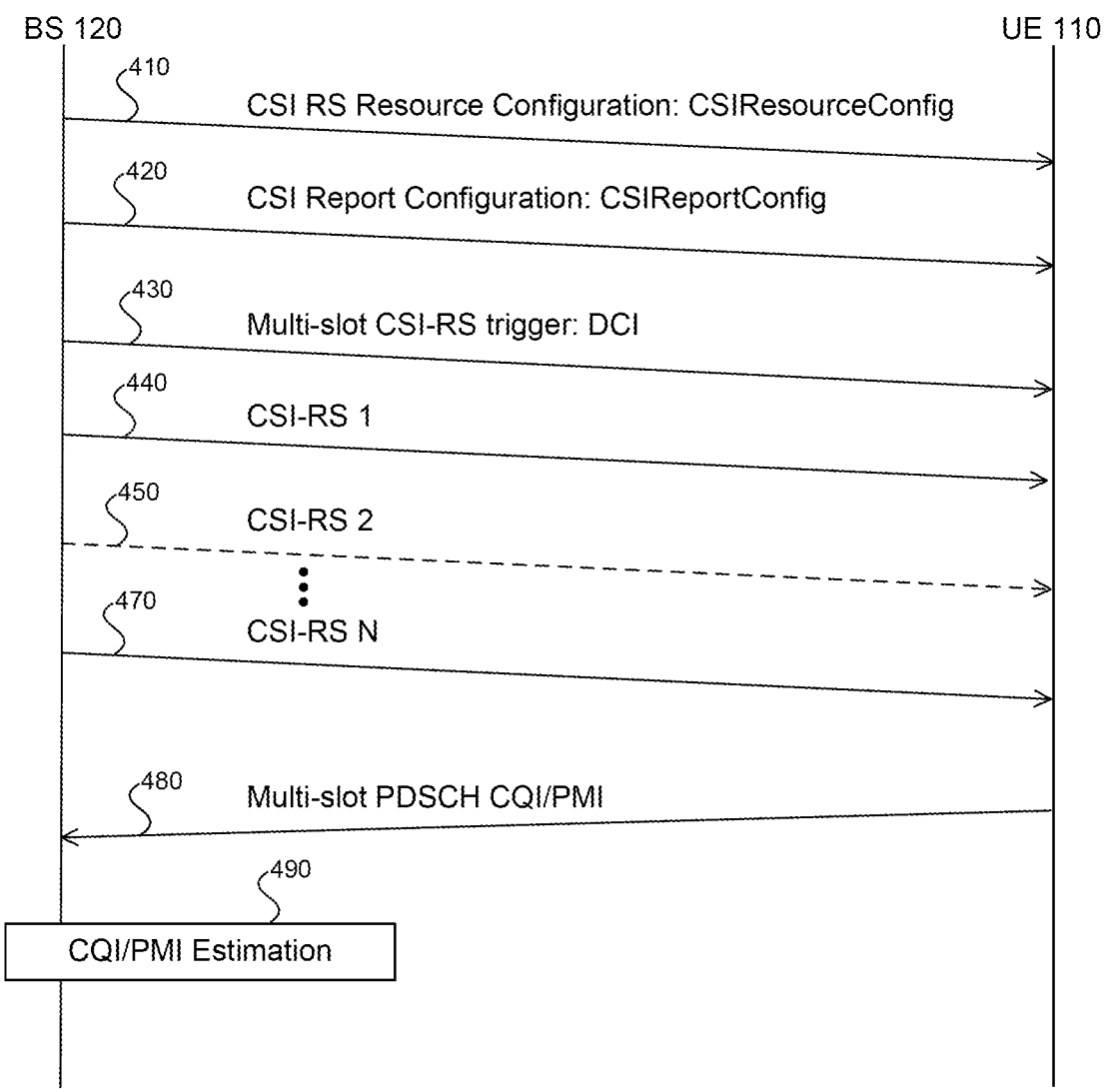
FIG. 4 illustrates an example of signaling for CSI feedback for multi-PDSCH transmission with a BS estimating CQI_effective, according to some embodiments of the disclosure.

FIG. 4 illustrates example 400 of signaling for CSI feedback for multi-PDSCH transmission with BS 120 estimating CQI_effective, according to some embodiments of the disclosure. As a convenience and not a limitation, FIG.

4 may be described with reference to elements from other figures in the disclosure. For example, example 400 can refer to signals transmitted between BS 120 and UE 110 of FIG. 1.

At 410, BS 120 can configure multi-slot CSI-RS resources suitable for measurement of channels corresponding to multiple PDSCH transmissions of a multi-PDSCH transmission. For example multi-slot CSI-RS for channel measurement and interference measurement on as single beam (e.g., same quasi-co-location (determining)). The measurements can be used for determining CQI_effective. BS 120 can transmit a CSI RS Resource Configuration signal, CSIResourceConfig, on the same beam). For example, the following CSI-RS resources may be utilized: multi-CSI-RS Aperiodic Non-Zero Power (NZP) CSI-RS for Channel Measurement (CM) and CSI Interference Management (IM) resource, and/or NZP CSI-RS for Interference Measurement (IM). The CQI feedback can be based on those CSI-RS resources. In some embodiments, the maximum value of the gap (X) between the first scheduled PDSCH/PUSCH and the last scheduled PDSCH/PUSCH may be pre-determined or signaled by BS 120. In some embodiments, X can be based on a UE capability and/or be a function of subcarrier spacing.

BS 120 can indicate CSI-RS resource set for multi-PDSCH CQI measurement and identify a reportQuantity. For example, BS 120 can request feedback of a single CSI Resource Indicator (CRI) or multiple CRT. For multiple CRI, individual CRI can be returned with a CQI feedback after a corresponding CSI-RS is received. For the single CRI, one CRI can be returned to BS 120 with multiple CQI feedback (e.g., with N CQI feedbacks corresponding to the N CSI-RS signals received.)

In some embodiments, BS 120 can define an Aperiodic NZP CSI-RS for CM/IM with periodicity, offset and a duration. The transmission of CSI-RS can stop after the duration. This can be a semi-persistent CSI-RS with a pre-determined duration.

At 420, BS 120 can indicate a need for CQI/PMI feedback for a multi-PDSCH transmission. For example, BS 120 can configure a multi-PDSCH CQI/PMI report by transmitting a CSI Report Configuration signal, CSIReportConfig.

At 430, BS 120 transmits a DCI signal to trigger the multi-slot CSI-RS.

At 440, BS 120 transmits CSI-RS 1 corresponding to a first CSI-RS of the multi-slot CSI-RS configuration. UE 110 receives CSI-RS 1 and determines corresponding CQI/PMI 1. In some embodiments, UE 110 transmits CQI/PMI corresponding to CSI-RS 1 (e.g., an individual CRI+CQI feedback.)

At 450, BS 120 transmits CSI-RS 2 corresponding to a second CSI-RS of the multi-slot CSI-RS configuration. UE 110 receives CSI-RS 2 and determines corresponding CQI/PMI 2, and so on until the Nth CSI-RS. In some embodiments, UE 110 transmits CQI/PMI corresponding to CSI-RS 2.

At 470, BS 120 transmits CSI-RS N corresponding to a last CSI-RS, N, of the multi-slot CSI-RS configuration. UE 110 receives CSI-RS N and determines corresponding CQI/PMI N. In some embodiments, UE 110 transmits CQI/PMI corresponding to CSI-RS N.

At 480, in some embodiments, UE 110 transmits a single CQI/PMI report including the results based on CSI-RS 1-N (e.g., a single CRI+multiple CQI feedback).

At 490, BS 120 can utilize the single CQI/PMI report from 480 or the multiple CQI/PMI report(s) received to determine a CQI/PMI estimation (e.g., a CQI_effective value) that can be used to estimate a MCS and/or beam to be signaled in a subsequent DCI scheduling a multi-PDSCH transmission. In some embodiments, each of the CQI and/or PMI feedback correspond to a possible PDSCH transmission of a multi-PDSCH transmission.

Figure 5:
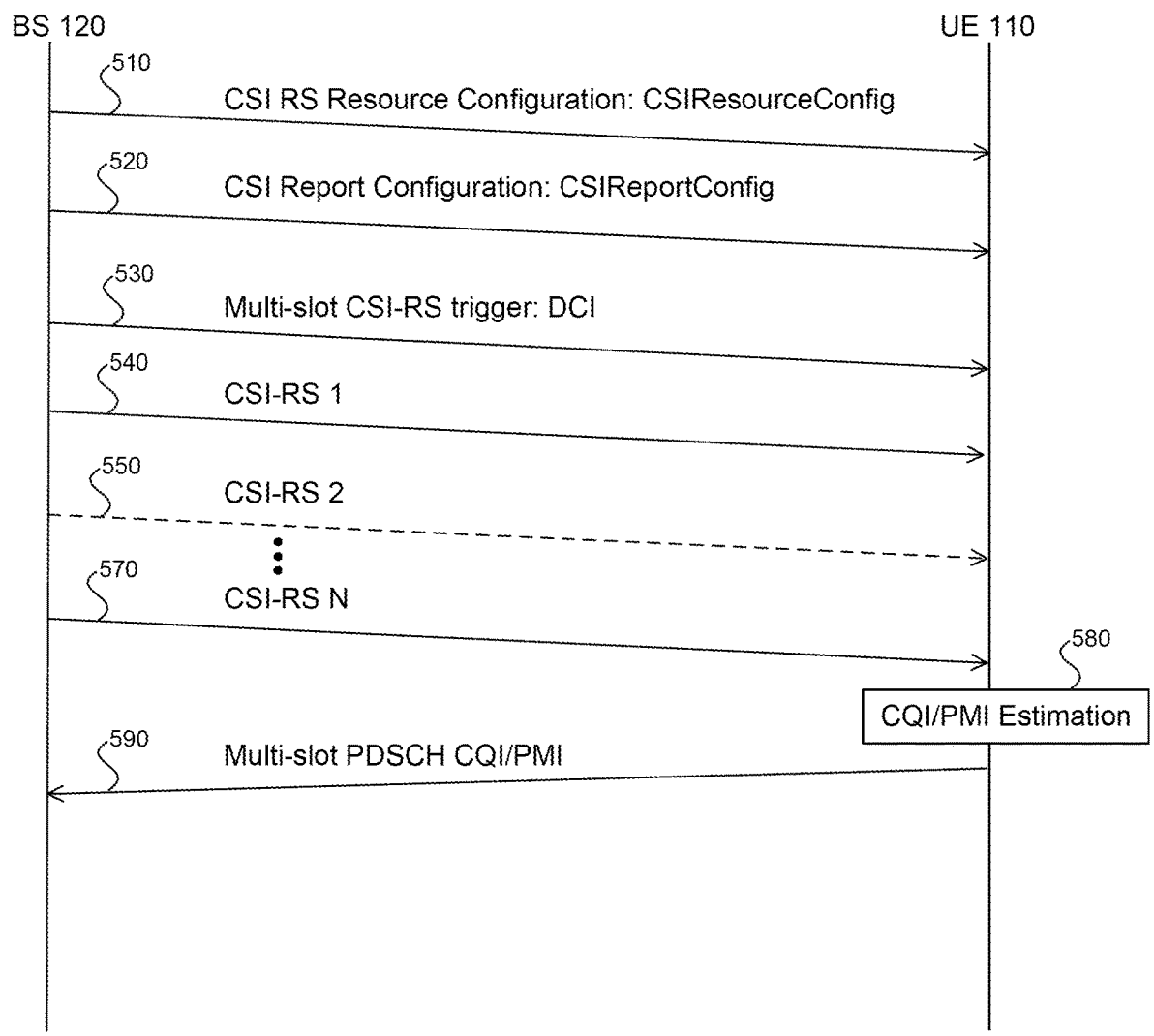
FIG. 5 illustrates an example of signaling for CSI feedback for multi-PDSCH transmission with a UE estimating CQI_effective, according to some embodiments of the disclosure.

FIG. 5 illustrates example 500 of signaling for CSI feedback for multi-PDSCH transmission with UE 110 estimating CQI_effective, according to some embodiments of the disclosure. As a convenience and not a limitation, FIG. 5 may be described with reference to elements from other figures in the disclosure. For example, example 500 can refer to signals transmitted between BS 120 and UE 110 of FIG. 1.

At 510, BS 120 can configure a multi-slot CSI-RS resources suitable for measurement of multiple PDSCH transmissions of a multi-PDSCH transmission. For example multi-slot CSI-RS for channel measurement and interference measurement on as single beam can be used for CQI_effective acquisition. BS 120 can transmit a CSI RS Resource Configuration signal, CSIResourceConfig, on the same beam (e.g., same quasi-co-location (QCL)). For example, CQI_effective may utilize NZP CSI-RS for CM and CSI Interference Management (IM) resource, and/or NZP CSI-RS for Interference Measurement (IM). In some embodiments, the maximum value of the gap (X) between the first scheduled PDSCH/PUSCH and the last scheduled PDSCH/PUSCH may be pre-determined or signaled by BS 120. In some embodiments, X can be based on a UE capability and/or be a function of subcarrier spacing.

At 520, BS 120 can indicate a need for CQI/PMI feedback for a multi-PDSCH transmission. For example, BS 120 can configure a multi-PDSCH CQI/PMI report by transmitting a CSI Report Configuration signal, CSIReportConfig.

At 530, BS 120 transmits a DCI signal to trigger the multi-slot CSI-RS.

At 540, BS 120 transmits CSI-RS 1 corresponding to a first CSI-RS of the multi-slot CSI-RS configuration. UE 110 receives CSI-RS 1 and determines corresponding CQI/PMI 1.

At 550, BS 120 transmits CSI-RS 2 corresponding to a second CSI-RS of the multi-slot CSI-RS configuration. UE 110 receives CSI-RS 2 and determines corresponding CQI/PMI 2, and so on until the Nth CSI-RS.

At 570, BS 120 transmits CSI-RS N corresponding to a last CSI-RS, N, of the multi-slot CSI-RS configuration. UE 110 receives CSI-RS N and determines corresponding CQI/PMI N.

At 580, UE 110 can utilize one or more of the CSI-RS 1-N to determine a CQI/PMI estimation (e.g., CQI_effective) that can be used to estimate a MCS and/or beam to be signaled in a subsequent DCI scheduling a multi-PDSCH transmission. For example, UE 110 can determine CQI_effective that correlates to multiple PDSCH transmissions of a multi-PDSCH transmission that can be received where each of the multiple PDSCH transmissions satisfies a corresponding target block error rate (BLER) (e.g., BLER=0.1/0.00001).

In some embodiments, UE 110 selects a CQI index where a transport block error portability target=y for an Xth PDSCH transmission of a multi-PDSCH transmission, where X=1, . . . , N. In some embodiments the Xth PDSCH transmission may be the last PDSCH transmission of the multi-PDSCH transmission. For example, BS 120 can indicate a CQI time urgency to enable UE 110 to estimate an appropriate CQI Index for CQI_effective. Time urgency of CSI can indicate how soon the CSI/CQI may be used. UE 110 can use this information and channel variation to determine a CQI index that is more aggressive CQI index (e.g., if BS 120 indicates that a multi-PDSCH transmission will be sent in the short term or in 1 second, the CQI Index selected for CQI_effective may correspond to a higher MCS). In another example, if BS 120 indicates that a multi-PDSCH transmission will be sent in the long term or in an hour, UE 110 may select a less aggressive CQI Index that may correspond to a lower MCS. The Time urgency of CSI may include option 1 and/or option 2:

Option 1: short term, medium term, long term
Option 2: t{1,2, ... , 10} i.e. time in seconds In some embodiments, BS 120 can indicate a type of transmission (e.g., CSI type) such as single PDSCH CQI requested (or bursty) or multi-PDSCH CQI requested (over time.) The multi-PDSCH CQI requested may also be indicated as a time-window of transmission. In some embodiments, UE 110 can determine CQI_effective based on a maximum interval between a first and last PDSCH in a TDRA table. In some embodiments, BS 120 can configure the maximum interval between a first and last PDSCH to be used in the estimate of CQI_effective. In some embodiments, BS 120 can indicate information in a CSIReportConfig as described above in 520 of FIG. 5.

In some embodiments, UE 110 selects a CQI index that satisfies a transport block error probability target, y, where y based on a function of the BLER (e.g., y=f(BLER(PDSCH 1), BLER(PDSCH 2), ... , BLER(PDSCH N)). The function may be an average, a prediction, or a function that may utilize artificial intelligence (AI). For example, if the function is an average, individual BLER(PDSCH 1) may be greater than or equal to y, BLER(PDSCH 2) may be less than y, but the overall function based on all of the PDSCH transmissions of the multi-PDSCH can still satisfy y.

For example, some embodiments enable L3 filtering for CQI_effective. As opposed to removing the effect of fast fading, the filtering seeks to find an effective CQI based on the CQI of the last N transmissions either at the L1 layer or at the L3 layer. BS 120 can define L3 filtering coefficients for CQI in QuantityConfig with the following configuration:

QuantityConfigRS: est-RS-Filtereonfig—this indicates that filtering is needed to generate the CQI for multi-PDSCH transmission.
FilterConfig: fillet-Coefficients-COI—this indicates the filtering coefficients that should be used.

Some embodiments enable L1 filtering for CQI with similar parameters to L3 filtering (e.g., define filter coefficients for L1 filtering) as shown below:

L1 filteringConfigRS
QuantityConfigRS: csi-RS-FilterConfig
FilterConfig: filter Coefficients-CQI In some embodiments, UE 110 selects a CQI Index where a transport block error probability target=y for all PDSCH transmissions of a multi-PDSCH transmission.

Figure 6A:
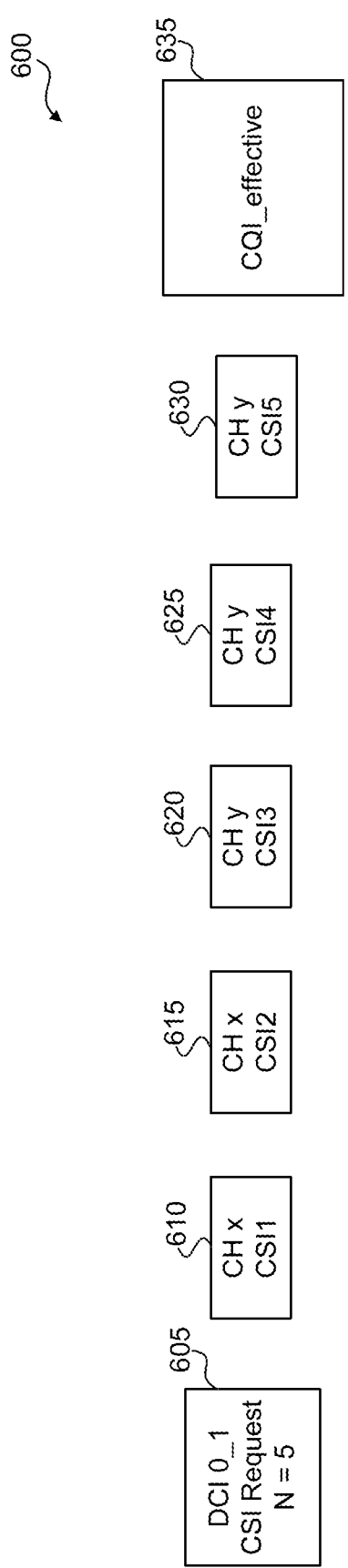
FIG. 6A illustrates an example of utilizing a last N CSI-reference signals (RSs) to determine CQI_effective, according to some embodiments of the disclosure.
Figure 6B:
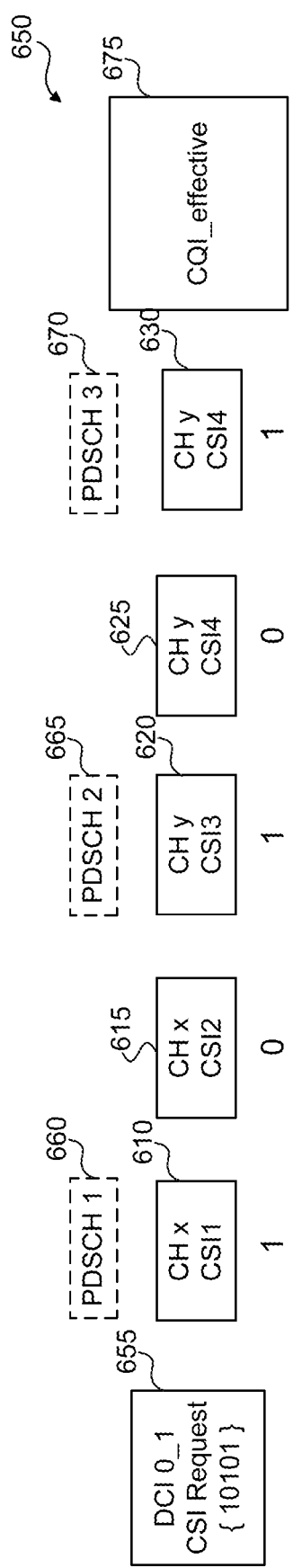
FIG. 6B illustrates an example of utilizing a bitmap of CSI-RSs to determine CQI_effective, according to some embodiments of the disclosure.

FIG. 6A illustrates example 600 of utilizing a last N CSI-RSs to determine CQI_effective, according to some embodiments of the disclosure. FIG. 6B illustrates example 650 of utilizing a bitmap of CSI-RSs to determine CQI_effective, according to some embodiments of the disclosure. As a convenience and not a limitation, FIGS. 6A and 6B may be described with reference to elements from other figures in the disclosure. For example, examples 600 and 650 can refer to signals transmitted between BS 120 and UE 110 of FIG. 1, and examples 600 and 650 may be used to perform functions of 580 of FIG. 5, where UE 110 selects a CQI Index where the transport block error probability target=y for all PDSCH transmissions of a multi-PDSCH transmission. For example, a modified a time restriction for channel measurement using a higher layer parameter, and a modified time restriction for interference measurement using a higher layer parameter, timeRestrietionForChannelMeasurements and/or timeRestrictionForInterferenceMeasurements, can be used to indicate that the CQI_effective determination is based on: the last N CSI-RS resources as shown in example 600, or a bitmap that indicates a subset of the last N CSI-RS resources as shown in example 650.

Example 600 illustrates BS 120 indicating that a last N CSI-RSs are used to determine CQI_effective. For example, BS 120 can indicate in the CSIReportConfig signal (e.g., 420 of FIG. 4 or 520 of FIG. 5) one or more of the following:

timeRestrictionForChannelMeasurements: multi-slot configuration: N
timeRestrictionForInterfereneMeasurements: multi-slot configuration: N BS 120 can transmit DCI 0_1 605 that includes a CSI Request where N=5. UE 110 receives the DCI 0_1 605 and prepares to utilize the last N CSI-RSs to determine CQI_effective.

BS 120 can subsequently transmit CSI-RSs 610, 615, 620, 625, and 630. Based on the time last 5 CSI-RSs, UE 110 can determine CQI_effective 635 to equal a CSI Index where the transport block error probability target=y for all PDSCH transmissions of a subsequent multi-PDSCH transmission. As an example, y may be greater than or equal to a BLER of (0.1/0.00001).

Example 650 illustrates BS 120 including a bitmap that indicates a subset of the last N CSI-RS resources are used to determine CQI_effective. For example, BS 120 can indicate in the CSIReportConfig signal (e.g., 420 of FIG. 4 or 520 of FIG. 5) one or more of the following:

timeRestrictionForChannelMeasurments: multi-slot configuration: N, bitmap
timeRestrictionForInterfereneMeasurements: multi-slot configuration: N, bitmap BS 120 can transmit DCI 0_1 655 that includes a CSI Request where N=5 and a bitmap of {1 0 1 0 1}. UE 110 receives the DCI 0_1 655 and prepares to apply the bitmap to the last N CSI-RSs to determine CQI_effective 675. The '1' of a bitmap may indicate the subsequent PDSCH transmissions of a multi-PDSCH transmission: PDSCH 1 660, PDSCH 2 665, and PDSCH 3 670.

BS 120 can subsequently transmit CSI-RSs 610, 615, 620, 625, and 630. Based on the bitmap applied to the last 5 CSI-RSs, UE 110 can determine the CQI_effective to equal a CSI Index where the transport block error probability target=y for all PDSCH transmissions of a subsequent multi-PDSCH transmission: PDSCH 1 660, PDSCH 2 665, and PDSCH 3 670. As an example, y may be greater than or equal to a BLER of (0.1/0.00001).

At 590, UE 110 transmits in a single report, the CQI/PMI estimation (e.g., CQI_effective value) to BS 120. BS 120 receives the single report and uses the CQI_effective value to determine an MCS for a subsequent multi-PDSCH transmission.

In some embodiments, additional fast CSI feedback in the form of a PMI can help BS 120 decide a precoder (e.g., PMI) for some follow-up transmissions before the multiple PDSCH transmissions of a multi-PDSCH transmission is complete. For example, if UE 110 moves quickly in a direction such that UE 110 may not receive the current transmission beam. Implementing fast CSI feedback may assist BS 120 in deciding a precoder (e.g., PMI) and change the current transmission beam to a different transmission beam during the multi-PDSCH transmission (e.g., for the remainder of the PDSCH transmissions of the multi-PDSCH transmission) to that UE 110 can continue to receive the remaining PDSCH transmissions of the multi-PDSCH transmission.

Figure 7A:
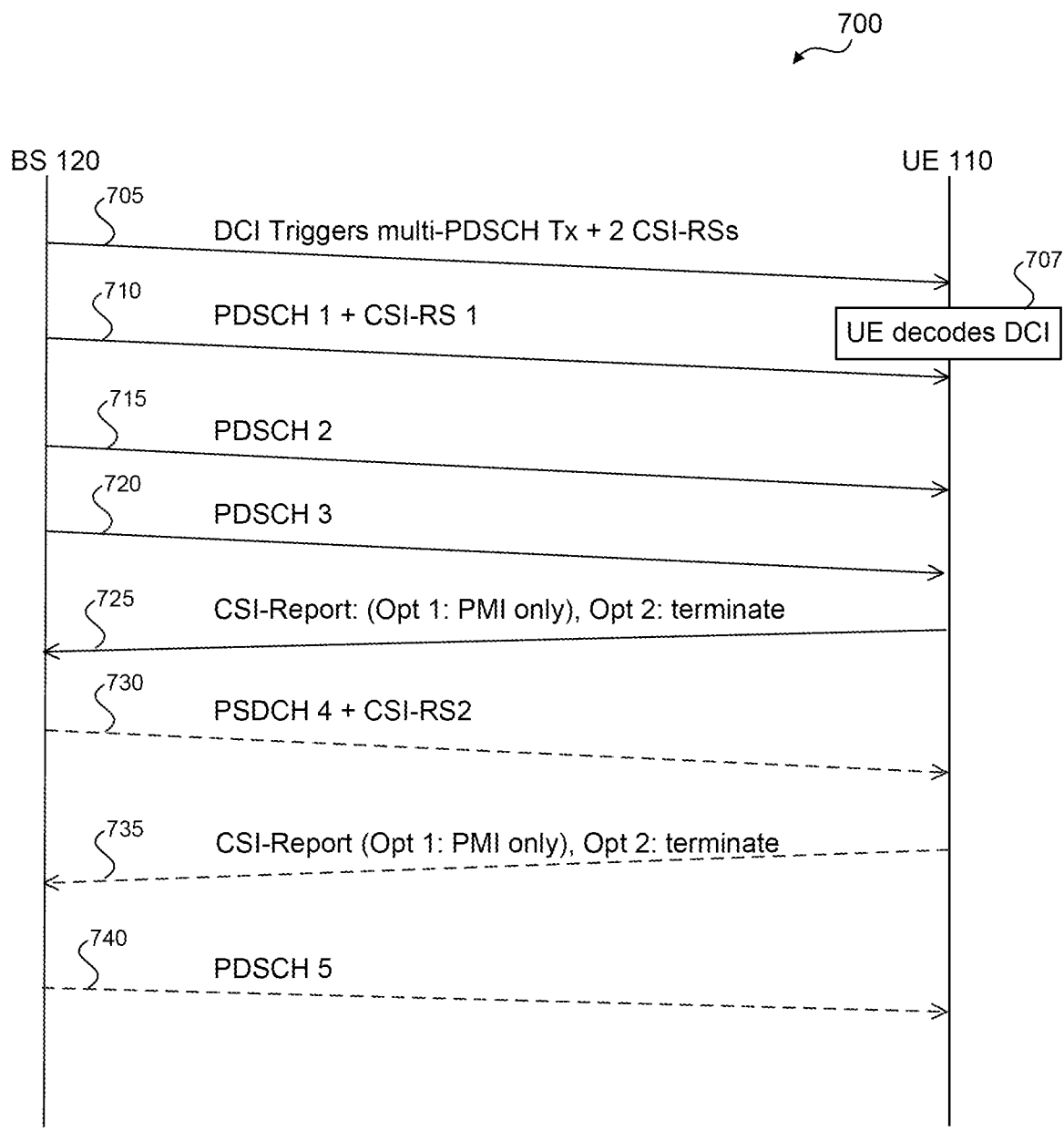
FIG. 7A illustrates an example of signaling to enable fast CSI feedback, according to some embodiments of the disclosure.
Figure 7B:
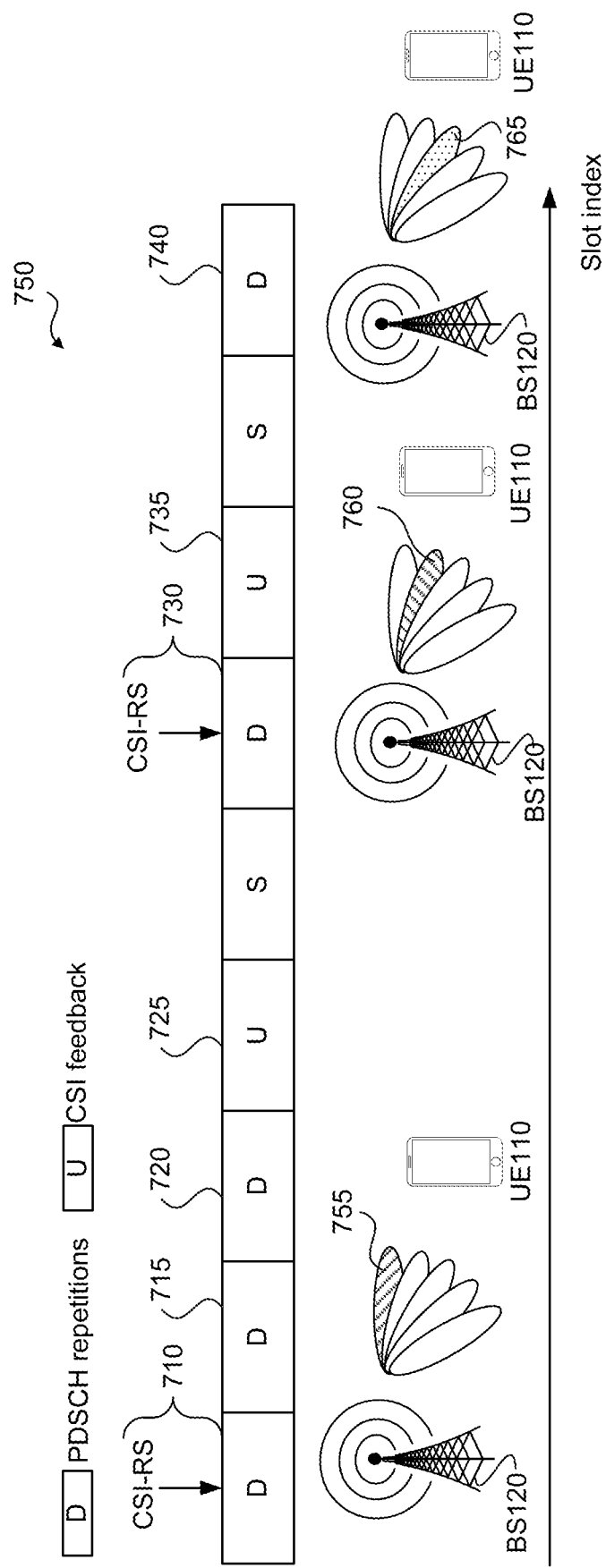
FIG. 7B illustrates an example fast CSI feedback, according to some embodiments of the disclosure.

FIG. 7A illustrates example 700 of signaling to enable fast CSI feedback, according to some embodiments of the disclosure. FIG. 7B illustrates example 750 of fast CSI feedback, according to some embodiments of the disclosure. As a convenience and not a limitation, FIGS. 7A and 7B may be described with reference to elements from other figures in the disclosure. For example, examples 700 and 750 can refer to signals transmitted between BS 120 and UE 110 of FIG. 1.

Example 700 illustrates signaling between BS 120 and UE 110 implementing fast CSI feedback and enabling BS 120 to change to a different transmission beam during a multi-PDSCH transmission.

At 705, BS 120 can transmit a DCI signal that triggers a multi-PDSCH transmission and two fast CSI-RSs. In some embodiments, one or both of the fast CSI-RSs may be triggered in a PDCCH separate from the DCI signal 705.

At 707, UE 110 decodes DCI signal 705.

At 710, BS 120 transmits PDSCH 1 transmission of the multi-PDSCH transmission and a first fast CSI-RS signal on a first beam. UE 110 receives the transmission of both PDSCH 1 and the first fast CSI-RS signal on the first beam.

At 715, BS 120 transmits PDSCH 2 transmission of the multi-PDSCH transmission on the first beam. UE 110 receives the transmission of PDSCH 2.

At 720, BS 120 transmits PDSCH 3 of the multi-PDSCH transmission on the first beam. UE 110 receives the transmission of PDSCH 3.

At 725, UE 110 transmits a first CSI-Report that includes CSI feedback based on the first fast CSI-RS signal. UE 110 may have moved in a direction that makes receiving signals on the first beam difficult (e.g., poor quality.) In some embodiments, the first CSI-Report only includes PMI since the rank should be consistent across repetitions. In some embodiments, the first CSI-Report indicates that the current rank+MCS cannot work (e.g., recommend that the multi-PDSCH transmission should be terminated for the remaining PDSCH transmissions of the multi-PDSCH transmission.)

At 730, assuming that the CSI-Report includes only PMI, BS 120 receives the CSI-Report and can adjust accordingly. BS 120 transmits PDSCH 4 of the multi-PDSCH transmission and the second fast CSI-RS signal on a second beam. UE 110 receives the transmission of both PDSCH 4 and the second fast CSI-RS signal on the second beam.

At 735, UE 110 transmits a second CSI-Report based on the second fast CSI-RS signal. In some embodiments, the second CSI-Report only includes PMI. In some embodiments, the second CSI-Report indicates that the multi-PDSCH transmission should be terminated. The second CSI-Report can indicate, for example, the quality of the signal reception on the second beam.

At 740, BS 120 receives the second CSI-Report with only the PMI, and BS 120 transmits PDSCH 5 of the multi-PDSCH transmission on a third beam. For example, BS 120 may determine that UE 110 has moved and the third beam will likely provide better signal reception for UE 110.

Example 750 illustrates the transmissions as well as the different beams. For example, CSI-RS 1 and PDSCH 1-3 transmissions at 710, 715, and 720 occur on beam 755. After UE 110 transmits the first CSI-Report with feedback including PMI on uplink 725, BS 120 changes beams and transmits PDSCH 4 and CSI-RS 2 at 730 on beam 760. After UE 110 transmits the second CSI-Report with feedback including PMI on uplink 735, BS 120 changes beams and transmits PDSCH 5 of the multi-PDSCH transmission on beam 765.

Figure 8:
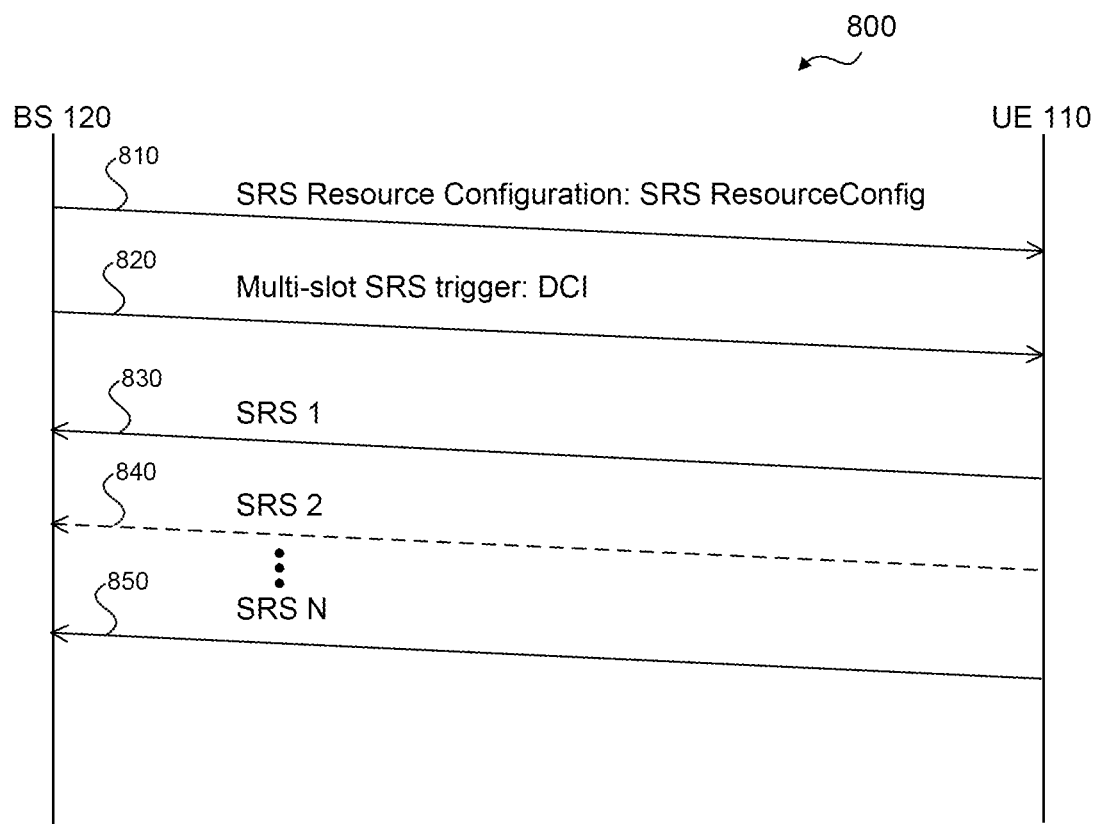
FIG. 8 illustrates an example of signaling to enable multi-slot Sounding Reference Signal (SRS), according to some embodiments of the disclosure.

FIG. 8 illustrates example 800 of signaling to enable multi-slot Sounding Reference Signal (SRS), according to some embodiments of the disclosure. As a convenience and not a limitation, FIG. 8 may be described with reference to elements from other figures in the disclosure. For example, example 800 can refer to signals transmitted between BS 120 and UE 110 of FIG. 1. A maximum interval between first and last PUSCH transmissions of a multi-PUSCH transmission can be set by BS 120. The MCS in the DCI is valid for all PUSCHs transmissions of the multi-PUSCH transmission. Thus, BS 120 needs to receive uplink channel information to ensure that the MCS selected is suitable for the first through the last PUSCH transmission of the multi-PUSCH transmission. In some embodiments, BS 120 may trigger a periodic or semi-persistent SRS and estimate the MCS to use based on the uplink SRS received over time. In some embodiments, BS 120 may aperiodically trigger an SRS Resource Set configured over multiple slots where BS 120 may estimate the MCS to use for a subsequent multi-PUSCH transmission.

Example 800 illustrates signaling between BS 120 and UE 110 to enable multi-slot SRS.

At 810, BS 120 transmits SRS Resource Configuration information (e.g., SRS ResourceConfig). UE 110 receives the SRS Configuration Information.

At 820, BS 120 transmits a multi-slot SRS trigger via a DCI signal. UE 110 receives the multi-slot SRS trigger.

At 830, UE 110 transmits SRS 1 corresponding to the multi-slot SRS trigger.

At 840, UE 110 transmits SRS 2 corresponding to the multi-slot SRS trigger and so on to SRS N.

At 850, UE 110 transmits SRS N corresponding to the last SRS of the multi-slot SRS trigger.

BS 120 analyzes the SRS signals 1-N and determines an appropriate MCS to be used in for a multi-PUSCH transmission that can be transmitted in a subsequent DCI. The appropriate MCS can be used by UE 110 for transmitting each of the PUSCH transmissions of the multi-PUSCH transmission.

Some embodiments enable UE 110 to provide feedback on one multi-PDSCH row of TDRA table 930 rather than an entire HARQ-ACK codebook as shown in example 900. Thus, the HARQ-ACK bits providing feedback for one multi-PDSCH row is much less than the HARQ-ACK bits for the entire HARQ-ACK codebook of example 900. In some embodiments, BS 120 can transmit a DCI signal scheduling the multi-PDSCH transmission (e.g., DCI format 0_1 to schedule multiple PUSCHs with a single DCI, or DCI format 1_1 to schedule multiple PDSCHs with a single DCI) can indicate a TDRA row of a TDRA table (e.g., row 935 of TDRA table 903.) In some embodiments, the DCI signal can include an indication that K1 includes one value. Based on the indication, UE 110 can generate HARQ-ACK bits only for the PDSCH transmissions 910 associated with the indicated TDRA row 935. The HARQ-ACK bits can be transmitted by UE 110 in PUCCH resource 910 to BS 120. In some embodiments, UE 110 generating HARQ-ACK bits for the indicated TDRA row (e.g., row 935 of TDRA table 903 that corresponds to PDSCH transmissions 920 of a multi-PDSCH transmission) can be subject to UE 110's capabilities and/or subject to configuration by BS 120.

In some embodiments, BS 120 indicates to UE 110 that UE 110 should provide HARQ-ACK information for only the received PDSCH. Thus, UE 110 does not expect to have a K1 value that requests feedback of any additional information in PUCCH resource 910. In other words, BS 120 manages PDSCH transmissions and multi-PDSCH transmissions to avoid more than one K1 value requesting feedback in PUCCH resource 910. In some embodiments the signaling from BS 120 can be applied only to non-fallback DCI with Downlink Assignment Index (DAD value=1 as in Rel-15/Rel-16 (e.g., 3GPP 38.213 Section 9.1.2.) In some embodiments, the signaling from BS 120 can be applicable to fall-back DCI with a new signaling field. In some embodiments, a HARQ-ACK codebook transmitted at a future time may include the same information (e.g., the HARQ-ACK bits corresponding to the multi-PDSCH row 935 and 920 transmission), or a HARQ-ACK codebook transmitted at a future time may not include the same information (e.g., the HARQ-ACK bits corresponding to the multi-PDSCH row 935 and 920 transmission).

Figure 10A:
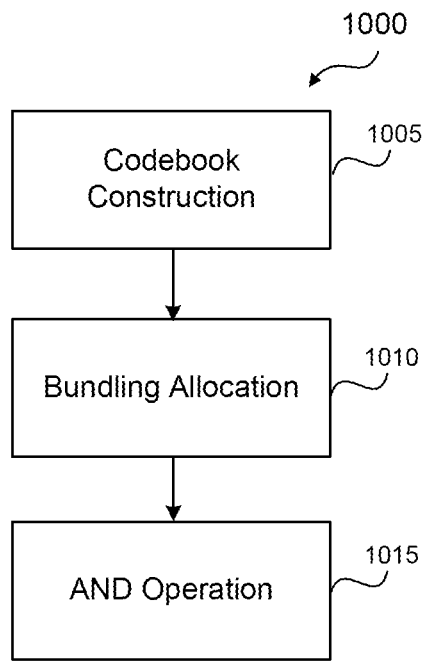
FIG. 10A illustrates an example of a Time Domain (TD) bundling for Type 1 HARQ-ACK codebook, in accordance with some embodiments of the disclosure.
Figure 10B:
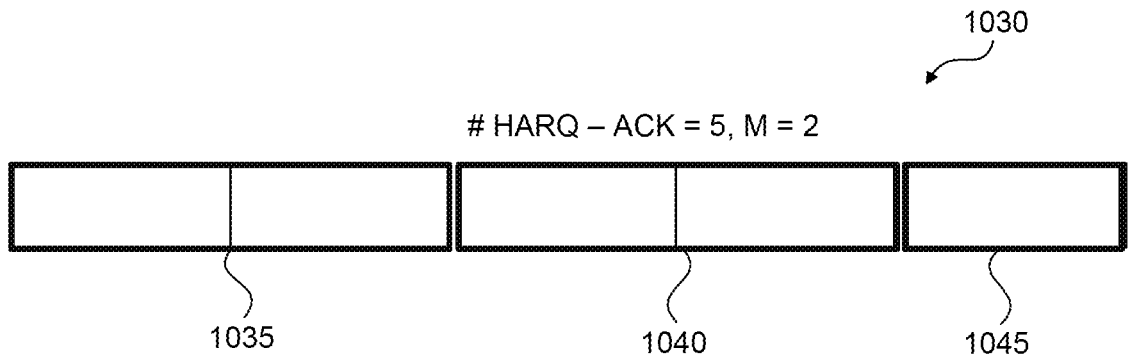
FIG. 10B illustrates an example of TD bundling with M number of bundles, according to some embodiments of the disclosure.
Figure 10C:
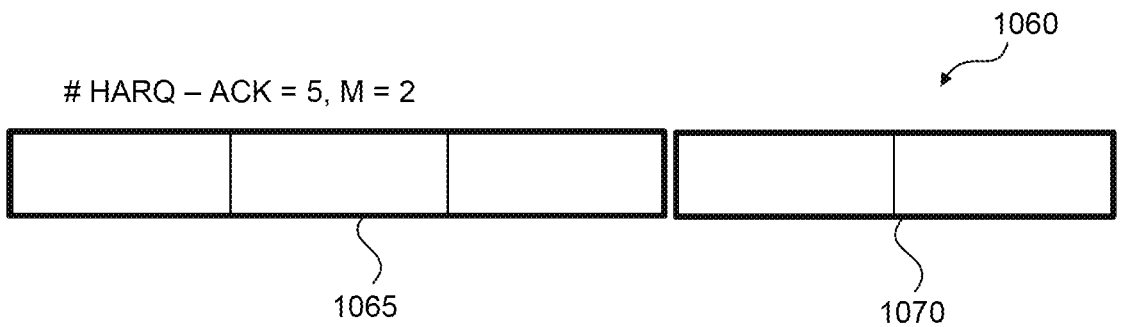
FIG. 10C illustrates an example of TD bundling with M bits per bundle within a bundle, according to some embodiments of the disclosure.

FIG. 10A illustrates example 1000 of a Time Domain (TD) bundling for Type 1 HARQ-ACK codebook, in accordance with some embodiments of the disclosure. FIG. 10B illustrates example 1030 of TD bundling with M bits per bundle, according to some embodiments of the disclosure. FIG. 10C illustrates example 1060 of TD bundling with M bundles, according to some embodiments of the disclosure. As a convenience and not a limitation, FIGS. 10A, 10B, and 10C may be described with reference to elements from other figures in the disclosure. For example, examples 1000, 1030, and 1060 can refer to signals transmitted between BS 120 and UE 110 of FIG. 1 as well as TDRA table 930 and the HARQ-ACK codebook of example 900 of FIG. 9.

Example 1000 enables TD bundling for Type 1 HARQ-ACK codebooks.

At 1005, UE 110 can construct a Type 1 HARQ-ACK codebook as shown in example 900 of FIG. 9. UE 110 can prune the HARQ-ACK bits per slot. Accordingly, there will be 5 HARQ-ACK bits that correspond to the slots: N-5, N-4, N-3, N-2, and N-1.

At 1010, UE 110 can perform allocations according to bundles as described in FIG. 10C or according to a maximum number of bits in a bundle as described in FIG. 10B. A bundle can be a group of bits to be operated on to produce a single bit for the HARQ-ACK codebook. In some embodiments, BS 120 can provide UE 110 with a number of bundles, M, via semi-static signaling (e.g., Radio Resource Control (RRC) signaling) or dynamic signaling (e.g., Media Access Control-Control Element (MAC-CE) or DCI.)

At 1015, UE 110 performs an AND operation within each bundle, and transmits the results to BS 120 via PUCCH resource 910. Thus, example 1000 reduces the number of HARQ-ACK bits that are ultimately transmitted to BS 120.

FIG. 10B illustrates example 1030 of TD bundling with M bits per bundle, according to some embodiments of the disclosure. BS 120 can configure UE 110 with a maximum number (M) of HARQ-ACK bits per HARQ-ACK bundle X. For each HARQ-ACK bundle, UE 110 can allocate M PDSCHs to each HARQ-ACK bundle. M may be a predetermined number, or M may be signaled by BS 120 to UE 110 (e.g., configured or dynamically indicated in PDCCH.) In scenarios where the number of HARQ-ACK bits is not a multiple of X, the last bundle can contain HARQ-ACKs corresponding to a smaller number of HARQ-ACK bits. Example A of Table 1. TD Bundling with M bits per Bundle illustrates an example with 5 HARQ-ACK pruned bits according to the slots with a maximum of M=2 bits per bundle.

TABLE 1

TD Bundling with M bits per Bundle

| # HARQ-ACK Pruned Bits | M maximum bits per Bundle | Example A of Bundles | Example B of Bundles of Equal Size |
|---|---|---|---|
| 5 | 1 | {0} {1} {2} {3} {4} | {0} {1} {2} {3} {4} |
| 5 | 2 | {0, 1} {2, 3} {4} | {0, 1} {2, 3} {4, A} |
| 5 | 3 | {0, 1, 2} {3, 4} | {0, 1, 2} {3, 4, A} |
| 5 | 4 | {0, 1, 2, 3} {4} | {0, 1, 2, 3} {4, A, A, A} |
| 5 | 5 | {0, 1, 2, 3, 4} | {0, 1, 2, 3, 4} |

Example 1030 illustrates that 5 HARQ-ACK pruned bits are allocated into 3 bundles (e.g., bundle 1035, bundle 1040, and bundle 1045) with a maximum of M=2 bits per bundle. After the AND operation, 3 HARQ-ACK bits, one per bundle, will be transmitted to BS 120 in PUCCH 910.

Example B of Table 1. TD Bundling with M bits per Bundle illustrates bundles of equal size where the number of HARQ-ACKs bundled per transmitted HARQ-ACK may be set as equal.

FIG. 10C illustrates example 1060 of TD bundling with M number of bundles, according to some embodiments of the disclosure. In some embodiments, UE 110 splits the pruned HARQ-ACK bits (e.g., the 5 HARQ-ACK bits after pruning) in to M bundles (e.g., M=2 bundles), where M is an integer. An AND operation can be performed on the bits in each bundle, and each bundle is mapped to a transmitted HARQ-ACK bit. When the number of pruned HARQ-bits are a multiple of M, an equal number of pruned HARQ-ACK bits are allocated to each HARQ-ACK bit. When the number of PDSCHs are not a multiple of M bundles, an unequal # of pruned HARQ-ACK bits are allocated to each transmitted HARQ-ACK bit. As shown in Table 2. TD Bundling with M Number of Bundles, with the # HARQ-ACK pruned bits according to the slots=5 and M=2 bundles, Example A shows bundles of unequal numbers of pruned HARQ-ACK bits.

In some embodiments, a number of pruned HARQ-ACK bits combined for each transmitted HARQ-ACK bit can be determined as follows:

Find # of pruned HARQ-ACK bit combined for each transmitted HARQ-ACK bit For count=0: #pruned_HARQ_ACK_bits-1 bundle_index=mod(count,M) bundle_index_number(bundle_index)=bundle index number(bundle_index)+1 Allocate pruned HARQ-ACK bits to the HARQ-ACK bundle Perform AND operation on HARQ-ACK bits in each bundle

TABLE 2

TD Bundling with M Number of Bundles

| # HARQ-ACK Pruned Bits | M Number of Bundles | Example A of Bundles | Example B of Bundles of Equal Size |
|---|---|---|---|
| 5 | 1 | {0, 1, 2, 3, 4} | {0, 1, 2, 3, 4} |
| 5 | 2 | {0, 1, 2} {3, 4} | {0, 1, 2} {3, 4, A} |
| 5 | 3 | {0, 1} {2, 3} {4} | {0, 1} {2, 3} {4, A} |
| 5 | 4 | {0, 1} {2} {3} {4} | {0, 1} {2, A} {3, A} {4, A} |
| 5 | 5 | {0} {1} {2} {3} {4} | {0} {1} {2} {3} {4} |

Example B of Table 2. TD Bundling with M Number of Bundles illustrates bundles of equal size where the number of HARQ-ACKs bundled per transmitted HARQ-ACK may be set as equal.

Example 1060 illustrates that 5 HARQ-ACK primed bits are allocated in to M=2 bundles (e.g., bundle 1065 and bundle 1070). After the AND operation, 2 bits—one per bundle, will be transmitted per bundle.

Some embodiments indicate a maximum value of a gap between two consecutively scheduled PDSCH transmissions of a multi-PDSCH transmission or a gap between two consecutively scheduled PUSCH transmissions of a multi-PUSCH transmission. For example, a gap may be based on channel access category level (e.g., CATxlevel) decided during channel access. For example, a gap may not be larger than the CATxduration. In some embodiments, a gap is based on physical transmission properties such as a switching time of UE 110 and transient time. For example, the gap should be greater than UE 110's switching time. UE 110's capabilities may be signaled to BS 120, for example. In some embodiments, a gap may be defined as X slots where X is a pre-defined value, or signaled by BS 120 to UE 110. The value of X may be based on a UE capability or a function of subcarrier spacing.

For full flexibility, some embodiments support slot level gaps between each PxSCH transmission but with a maximum slot gap between consecutive transmissions and a maximum gap between the first and last PxSCH transmitted. This reduces the memory needed for buffering and for downlink (depending on the variation in the channel), may reduce the need for a modification of the CSI feedback needed for multi-PxSCH. As multi-PxSCH transmission has been proposed to enable PxSCH transmission between multiple PDCCH monitoring occasions that may be limited due to multi-slot monitoring, the maximum gap between any PxSCH transmissions should factor in the multi-slot monitoring (MSM) parameters e.g. 4 slots for 480 kHz and 8 slots for 960 kHz. Note that support for only one PxSCH transmission per slot implies only one SLIV per slot.

Some embodiments include slot level gaps between each PxSCH transmission of a multi-PxSCH transmission, but with a maximum slot gap between consecutive transmissions and a maximum gap between the first and last PxSCH transmitted. Accordingly less memory may be needed for buffering and for downlink (e.g., depending on the variation in the channel), and thus, the need for a modification of the CSI feedback for multi-PxSCH may also be reduced. As multi-PxSCH transmission can enable PxSCH transmission between multiple PDCCH monitoring occasions that may be limited due to multi-slot monitoring, the maximum gap between any PxSCH transmissions should factor in the multi-slot monitoring (MSM) parameters e.g. 4 slots for 480 kHz and 8 slots for 960 kHz. Some embodiments support only one PxSCH transmission per slot implying only one SLIV per slot.

Figure 11:
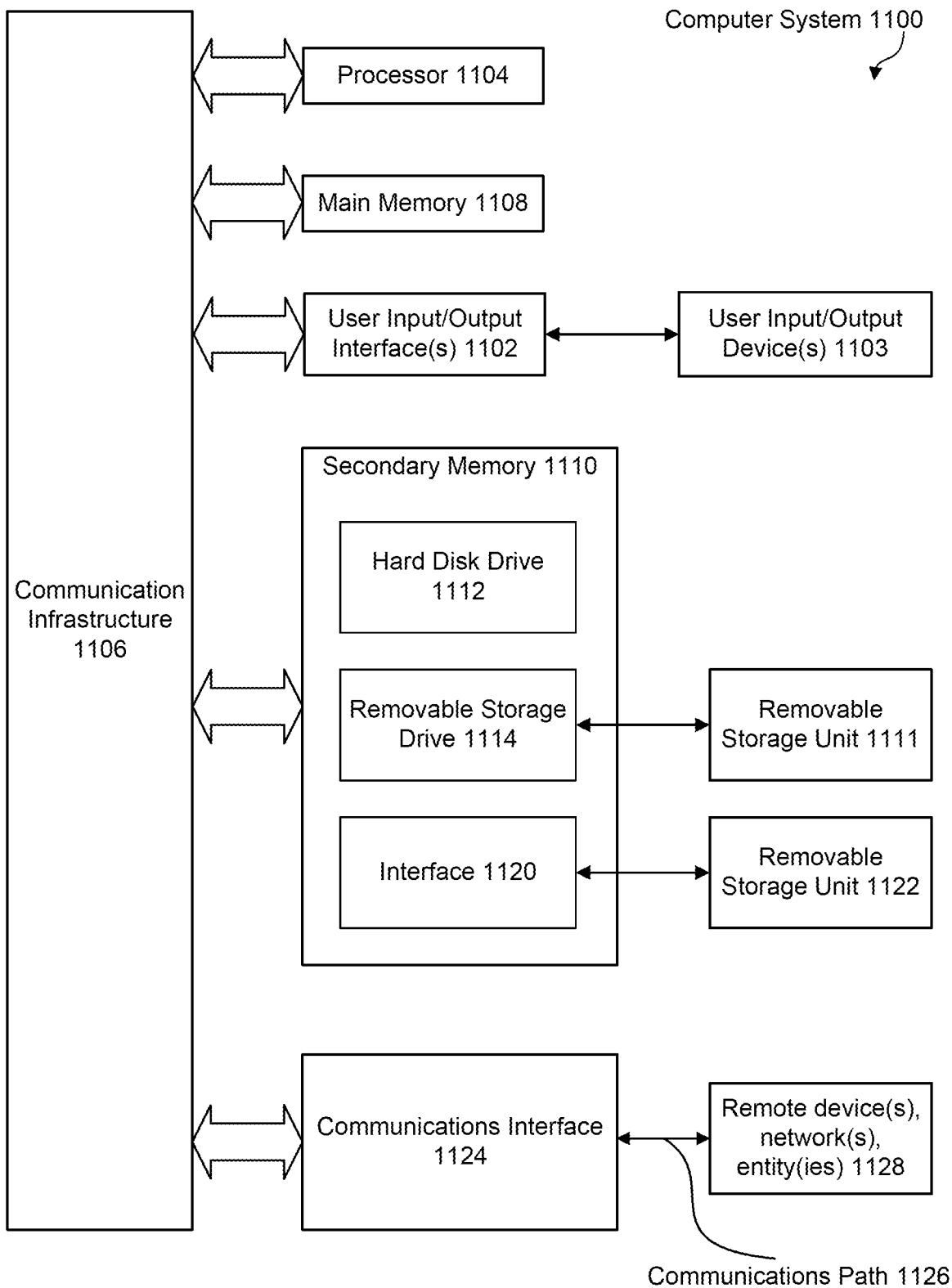
FIG. 11 is an example computer system for implementing some embodiments or portion(s) thereof.

Various embodiments can be implemented, for example, using one or more well-known computer systems, such as computer system 1100 shown in FIG. 11. Computer system 1100 can be any well-known computer capable of performing the functions described herein. For example, and without limitation, UE 110 and BS 120 of FIG. 1; system 200 of FIG. 2; perform the functions of examples of FIGS. 3A, 3B, 3C, 6A, 6B, 7B, 9, 10B, and 10C; methods 400 of FIG. 4, 500 of FIG. 5, 700 of FIG. 7A, 800 of FIGS. 8, and 1000 of FIG. 10A (and/or other apparatuses and/or components shown in the figures) may be implemented using computer system 1100, or portions thereof.

Computer system 1100 includes one or more processors (also called central processing units, or CPUs), such as a processor 1104. Processor 1104 is connected to a communication infrastructure or bus 1106. One or more processors 1104 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 also includes user input/output device(s) 1103, such as monitors, keyboards, pointing devices, etc., that communicate with communication infrastructure 1106 through user input/output interface(s) 1102. Computer system 1100 also includes a main or primary memory 1108, such as random access memory (RAM). Main memory 1108 may include one or more levels of cache. Main memory 1108 has stored therein control logic (e.g., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 includes a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 reads from and/or writes to removable storage unit 1118 in a well-known manner According to some embodiments, secondary memory 1110 may include other means, instrumentalities or other approaches for allowing computer programs and/or other instructions and/or data to be accessed by computer system 1100. Such means, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Computer system 1100 may further include a communication or network interface Communication interface 1124 enables computer system 1100 to communicate and interact with any combination of remote devices, remote networks, remote entities, etc. (individually and collectively referenced by reference number 1128). For example, communication interface 1124 may allow computer system 1100 to communicate with remote devices 1128 over communications path 1126, which may be wired and/or wireless, and which may include any combination of LANs, WANs, the Internet, etc. Control logic and/or data may be transmitted to and from computer system 1100 via communication path 1126.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1100, main memory 1108, secondary memory 1110 and removable storage units 1118 and 1122, as well as tangible articles of manufacture embodying any combination of the foregoing. Such control logic, when executed by one or more data processing devices (such as computer system 1100), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 11. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A user equipment (UE) comprising:
a transceiver; and
a processor coupled to the transceiver, configured to:
receive, via the transceiver, one or more Channel State Information (CSI)-Reference Signals (RSs);
transmit, via the transceiver, Channel Quality Indicator (CQI) feedback corresponding to the one or more CSI-RSs received, wherein the CQI feedback is determined utilizing a time urgency type;
receive, via the transceiver, a single downlink control information (DCI) signal used to schedule multiple Physical Downlink Shared Channel (PDSCH) transmissions, wherein the multiple PDSCH transmissions are based at least on one modulation and coding scheme (MCS) corresponding to the CQI feedback;
construct a Hybrid Automatic Repeat Request Acknowledgement (HARQ-ACK) codebook based at least on the multiple PDSCH transmissions;
prune HARQ-ACK bits of the HARQ-ACK codebook;
allocate the pruned HARQ-ACK bits to X bundles, with M bits per bundle, where X and M are integers; and
perform an AND operation within a bundle of the X bundles.

2. The UE of claim 1, wherein a PDSCH transmission of the multiple PDSCH transmissions corresponds to a CSI-RS of the one or more CSI-RSs.

3. The UE of claim 1, wherein the CQI feedback comprises:
multiple CSI Resource Indicators (CRIs) that correspond to the one or more CSI-RSs, wherein a CRI of the multiple CRIs includes a corresponding CQI; or
a single CRI with multiple CQIs, wherein the multiple CQIs correspond to the one or more CSI-RSs.

4. The UE of claim 1, wherein the CQI feedback is a CQI_effective, and the processor is further configured to:

determine the CQI_effective based at least on the one or more CSI-RSs.

5. The UE of claim 4, wherein to determine the CQI_effective, the processor is configured to:
utilize a last N CSI-RSs of the one or more CSI-RSs received, where N is an integer.

6. The UE of claim 4, wherein to determine the CQI_effective, the processor is configured to:
utilize a subset of a last N CSI-RSs of the one or more CSI-RSs received, where N is an integer.

7. The UE of claim 4, wherein to determine the CQI_effective, the processor is configured to:
utilize at least one CSI-RS of the one or more CSI-RSs that corresponds to at least one PDSCH transmission of the multiple PDSCH transmissions.

8. The UE of claim 7, wherein to determine the CQI_effective, the processor is configured to utilize the time urgency type corresponding to a short term, a medium term, or a long term, to estimate a CQI Index.

9. The UE of claim 7, wherein to determine the CQI_effective, the processor is configured to utilize:
a single PDSCH CQI corresponding to a PDSCH transmission of the multiple PDSCH transmissions, or multiple PDSCH CQIs corresponding to the multiple PDSCH transmissions.

10. The UE of claim 4, wherein to determine the CQI_effective, the processor is configured to:
utilize a function of error probabilities of PDSCH transmissions of the multiple PDSCH transmissions.

11. The UE of claim 1, wherein
a Time Domain Resource Allocation (TDRA) row corresponds to the multiple PDSCH transmissions, the processor is further configured to generate the HARQ-ACK bits for PDSCH transmissions of the multiple PDSCH transmissions associated with the TDRA row.

12. The UE of claim 11, wherein the processor is further configured to:
receive an indication that K1 corresponding to the multiple PDSCH transmissions includes a single value.

13. The UE of claim 1, wherein the processor is further configured to:
receive, via the transceiver, a configuration message comprising:
a Quasi co-location (QCL), and a multi-CSI-RS Aperiodic Non-Zero Power (NZP) CSI-RS for channel measurement (CM) with multi-PDSCH feedback; or
the QCL and a multi-CSI-RS Aperiodic NZP CSI-RS for CM with periodicity, offset, and a duration, wherein a transmission of the one or more CSI-RSs to the UE stops after the duration.

14. A method for a user equipment (UE), comprising:
receiving one or more Channel State Information (CSI) Reference Signals (RSS);
transmitting Channel Quality Indicator (CQI) feedback corresponding to the one or more CSI-RSs received, wherein the CQI feedback is determined utilizing a time urgency type;
receiving a single downlink control information (DCI) signal used to schedule multiple Physical Downlink Shared Channel (PDSCH) transmissions, wherein the multiple PDSCH transmissions use a modulation and coding scheme (MCS) based at least on the CQI feedback;
constructing a Hybrid Automatic Repeat Request Acknowledgement (HARQ-ACK) codebook based at least on the multiple PDSCH transmissions;
pruning HARQ-ACK bits of the HARQ-ACK codebook;
allocating the pruned HARQ-ACK bits to X bundles, with M bits per bundle, where X and M are integers; and
performing an AND operation within a bundle of the X bundles.

15. The method of claim 14, wherein a number of the pruned HARQ-ACK bits is not a multiple of X, a last bundle of the X bundles includes less than M bits.

16. A non-transitory computer-readable medium storing instructions that, when executed by a processor of a user equipment (UE), cause the UE to perform operations, the operations comprising:
receiving one or more Channel State Information (CSI) Reference Signals (RSS);
transmitting Channel Quality Indicator (CQI) feedback corresponding to the one or more CSI-RSs received, wherein the CQI feedback is determined utilizing a time urgency type;
receiving a single downlink control information (DCI) signal used to schedule multiple Physical Downlink Shared Channel (PDSCH) transmissions, wherein the multiple PDSCH transmissions use a modulation and coding scheme (MCS) based at least on the CQI feedback;
constructing a Hybrid Automatic Repeat Request Acknowledgement (HARQ-ACK) codebook based at least on the multiple PDSCH transmissions;
pruning HARQ-ACK bits of the HARQ-ACK codebook;
allocating the pruned HARQ-ACK bits to X bundles, with M bits per bundle, where X and M are integers; and
performing an AND operation within a bundle of the X bundles.

17. The non-transitory computer-readable medium of claim 16, wherein a PDSCH transmission of the multiple PDSCH transmissions corresponds to a CSI-RS of the one or more CSI-RSs.

18. The non-transitory computer-readable medium of claim 16, wherein the CQI feedback comprises:
multiple CSI Resource Indicators (CRIs) that correspond to the one or more CSI-RSs, wherein a CRI of the multiple CRIs includes a corresponding CQI; or
a single CRI with multiple CQIs, wherein the multiple CQIs correspond to the one or more CSI-RSs.

19. The non-transitory computer-readable medium of claim 16, wherein the CQI feedback is a CQI_effective, the operations further comprise:
determining the CQI_effective based at least on the one or more CSI-RSs.

20. The non-transitory computer-readable medium of claim 19, wherein the determining the CQI_effective comprises:
utilizing a last N CSI-RSs of the one or more CSI-RSs received, where N is an integer.

* * * * *

UNITED STATES PATENT AND TRADEMARK OFFICE
CERTIFICATE OF CORRECTION

| | | |
|---|---|---|
| PATENT NO. | : 12,294,434 B2 | Page 1 of 1 |
| APPLICATION NO. | : 17/442083 | |
| DATED | : May 6, 2025 | |
| INVENTOR(S) | : Oteri et al. | |

It is certified that error appears in the above-identified patent and that said Letters Patent is hereby corrected as shown below:

On the Title Page

Column 2, Item (57), in "ABSTRACT", Line 3, delete "information" and insert -- Information --, therefor.

In the Specification

In Column 7, Line 10, delete "(determining))." and insert -- (QCL)). --, therefor.

In Column 7, Line 28, delete "CRT." and insert -- CRI. --, therefor.

In Column 9, Line 40, delete "est-RS-Filtereonfig" and insert -- csi-RS-FilterConfig --, therefor.

In Column 9, Line 43, delete "fillet-Coefficient" and insert -- filterCoefficients --, therefor.

In Column 10, Line 3, delete "timeRestrietionForChannelMeasurements" and insert -- timeRestrictionForChannelMeasurements --, therefor.

In Column 13, Line 7, delete "(DAD" and insert -- (DAI) --, therefor.

In Column 15, Line 1, delete "primed" and insert -- pruned --, therefor.

In Column 15, Line 60, delete "FIGS." and insert -- FIG. --, therefor.

In the Claims

In Column 19, Claim 14, Line 53, delete "(RSS);" and insert -- (RSs); --, therefor.

In Column 20, Claim 16, Line 20, delete "(RSS);" and insert -- (RSs); --, therefor.

Signed and Sealed this
Tenth Day of June, 2025

Coke Morgan Stewart
*Acting Director of the United States Patent and Trademark Office*